United States Patent [19]

Baisden

[11] 4,251,554

[45] Feb. 17, 1981

[54] EDIBLE FOOD CONTAINER AND MOLD FOR FORMING SAME

[76] Inventor: C. Robert Baisden, 11127 Willow Bottom Dr., Columbia, Md. 21044

[21] Appl. No.: 46,033

[22] Filed: Jun. 6, 1979

[51] Int. Cl.³ .................. A21D 10/02; A21D 8/02
[52] U.S. Cl. ..................... 426/128; 426/113; 426/138; 426/143; 426/280; 426/283; 99/439
[58] Field of Search .............. 426/138, 143, 279, 280, 426/389, 496, 499, 512, 514, 549, 132, 128, 113, 283; D1/3, 24; 99/428, 442, 439, 441, 354; 249/136, 204, 121

[56] References Cited

U.S. PATENT DOCUMENTS

| D. 118,614 | 1/1940 | Brin | D1/24 |
|---|---|---|---|
| 692,919 | 2/1902 | Schaumloeffel et al. | 249/136 |
| 1,107,479 | 8/1914 | Benson | 249/136 |
| 1,816,283 | 7/1931 | Holibaugh | 426/138 |
| 1,936,835 | 11/1933 | Fairchild | 426/138 |
| 1,975,031 | 9/1934 | Wilkes et al. | 426/499 |
| 2,271,921 | 2/1942 | Luker | 99/428 |
| 3,290,154 | 12/1966 | Turner | 426/138 |
| 3,341,167 | 9/1967 | Weiss | 249/122 |

Primary Examiner—Raymond N. Jones
Assistant Examiner—Elizabeth J. Curtin
Attorney, Agent, or Firm—Morton J. Rosenberg

[57] ABSTRACT

An edible food container (10) and mold (22) for making the same. The edible food container (10) is cylindrically contoured and extends in a longitudinal direction having a cylindrical food cavity formed therein. An end section (16) of edible food container (10) is closed to provide an overall cup-shaped contour. A food (12) may be inserted within the food cavity (14) and the food (12) and edible food container (10) may be consumed as a unitary combination. The food (12) is captured within the edible food container (10) and provides for a minimization of leakage and spillage during the ingestion process.

2 Claims, 3 Drawing Figures

U.S. Patent  Feb. 17, 1981  4,251,554
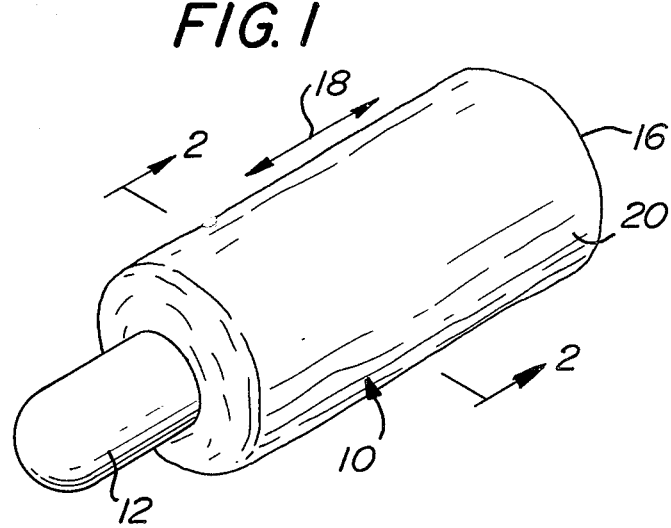
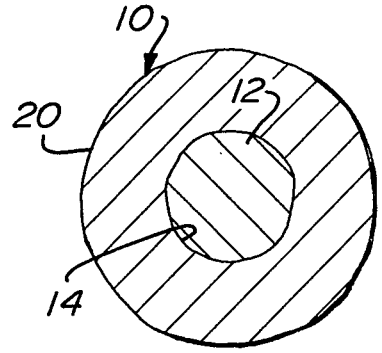
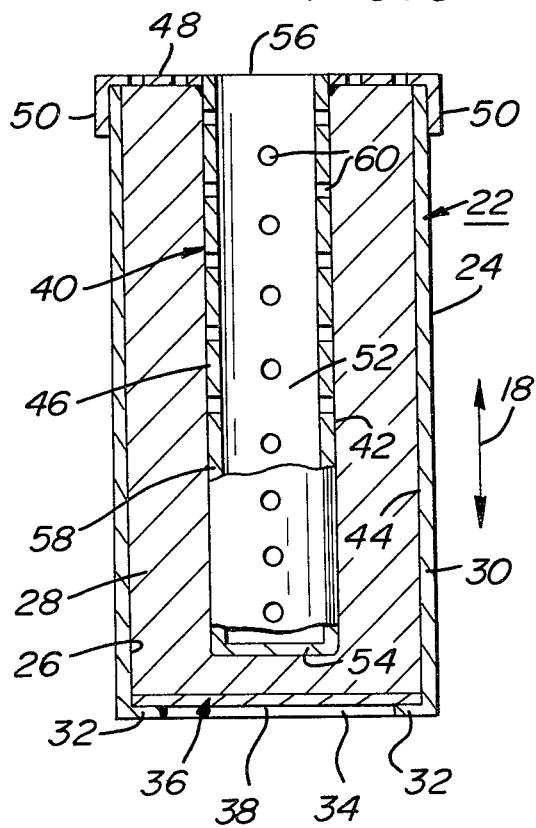

EDIBLE FOOD CONTAINER AND MOLD FOR FORMING SAME

BACKGROUND OF THE INVENTION FIELD OF THE INVENTION

This invention pertains to edible food containers adapted for the insertion of a food product. This invention relates to a cylindrically contoured edible food container having a cylindrical cavity formed therein for insertion of the food. In particular, this invention relates to an edible food container mold for making an edible food container. More in particular, this invention relates to an edible container mold having an outer housing and an inner housing between which an unprocessed food product is molded. More in particular, this invention relates to an edible container mold which includes a removal mechanism for the processed food product. More in particular, this invention relates to an edible container mold having vent openings for release of gases formed during the processing operation.

PRIOR ART

Rolls for containing sausage-like food products are well-known in the art. The closest prior art known to applicant includes U.S. Pat. Nos. 1,816,283; 1,543,650; 1,569,121; 1,726,946; 2,120,710; 2,608,485; 2,051,682; 1,936,835; and, 1,715,857.

In some prior art systems such as that shown in U.S. Pat. No. 1,816,283, a roll for a sausage-like food product is contoured in the form of a cylinder. Such prior art systems further include a pocket for the insert of the sausage-like element. However, such prior rolls provide for a slit or an opening throughout a predetermined longitudinal extension of the roll. Such openings in the side of the roll would defeat one of the important aspects of the subject inventive concept, in that such a prior art roll would not minimize the possibility of leakage or spillage of liquid from the product contained therein.

Other prior art systems, such as that shown in U.S. Pat. No. 1,543,650 provide for a cylindrical roll within which a sausage-like element may be inserted. However, in such prior art rolls, such includes a through opening thus having openings on both ends of the roll. These prior art systems do not provide for pocket inserts to contain the food therein.

SUMMARY OF THE INVENTION

An edible food container mold which includes an outer housing extending in a longitudinal direction. The outer housing is substantially cylindrically contoured and has a central cavity for insertion of a food product to be processed. Additionally, the container mold includes an inner housing which is releasably mounted to the outer housing and extends internal the central cavity of the outer housing. The inner housing has a longitudinal dimension substantially less than the outer housing. The food product to be processed is contained between an outer wall surface of the inner housing and an inner wall surface of the outer housing.

BRIEF DESCRIPTION OF THE DRAWINGS

FIG. 1 is a perspective view of the edible food container, having a food product inserted therein;

FIG. 2 is a sectional view of the edible food container, taken along the section line 2—2 of FIG. 1; and, FIG. 3 is a cross-sectional view of the edible container mold, showing the inner housing releasably mounted within the outer housing of the mold.

DESCRIPTION OF THE PREFERRED EMBODIMENTS

Referring now to FIGS. 1 and 2, there is shown edible food container 10 utilized for insertion of food 12 for ultimate ingestion by a user. In overall concept, edible food container 10 is provided to capture food 12 in a manner such that food 12 may be consumed with a minimization of spillage or leakage during the consuming thereof. It is to be understood that although FIGS. 1 and 2 show food 12 to be of a sausage-like contour, that such food 12 may be any type of food article suitable for ingestion. Additionally, edible food container 10 may be formed of a bread-like composition, or other food composition unimportant to the inventive concept as is herein described.

Food container 10 includes food cavity 14 for insertion of food 12. As can be seen, edible food container 10 is generally tubularly contoured and closed at end section 16. Food cavity 14 is also generally tubularly contoured and extends in longitudinal direction 18 to a length substantially less than the overall longitudinal extension of food container 10. In this manner, food product 12, which may be a frankfurter or sausage-like article 12, may be inserted within food cavity 14 throughout the longitudinal extension of cavity 14. The user may then grasp food container 10 around longitudinally extended container sidewall 20 for ease of consumption of food 12. Closed end section 16 provides for capturing of food 12 and minimizes the possibility of leakage or spillage upon consumption.

Food container 10 may be formed of a bread-like composition for absorption of various liquids being emitted by food 12. Thus, such liquids are consumed as food 12 and container 10 are ingested by the user. Container 10 may be used for insert of sausage-like foods 12, foods subject to melting such as ice-cream, or a wide variety of viscous sauces.

Referring now to FIG. 3, there is shown edible food container mold 22 used for forming edible food container 10. Mold 22 includes outer housing 24 extending in longitudinal direction 18. Outer housing 24 is substantially cylindrically contoured and includes outer housing central cavity 26 for insertion of food product 28 to be processed. Food product 28 in the unprocessed state may be a dough-like composition which would be heated after insertion into edible container mold 22.

Outer housing 24 includes tubular member 30 forming a continuous sidewall extending in longitudinal direction 18. Tubular member 30 further includes annularly contoured flange member 32 secured to a lower surface of tubular member 30. Flange member 32 and sidewall 30 may be formed in one-piece formation. Annularly contoured flange member 32 provides for flange opening 34 in communication with outer housing central cavity 26, as is shown in FIG. 3.

Outer housing 24 includes removal mechanism 36 for providing an effective method of removing food product 28 subsequent to processing. Food removal mechanism 36 includes disc member 38 which is cylindrically contoured and includes a diameter substantially equal to, but slightly less than an inner diameter of tubular member 30. As is seen in FIG. 3, disc member 38 is releasably mounted on annularly contoured flange member 32.

Through external actuation, disc member 38 may be linearly displaced in longitudinal direction 18 within outer housing central cavity 26. Subsequent to food processing, food product 28 may be removed from mold 22 through longitudinal actuation of disc member 38 in an upward direction, as is shown in FIG. 3. This type of removal provides for a simplified food product egress from mold 22.

Container mold 22 further includes inner housing 40 for providing food cavity 14 in final food product 10. Inner housing 40 is releasably mounted to outer housing 24 and extends internal central cavity 26 of outer housing 24. Inner housing 40 includes a longitudinal dimension substantially less than outer housing 24 for purposes to be described in following paragraphs. Food product 28 to be processed is constrained between inner housing outer wall surface 42 and outer housing inner wall surface 44, as is shown.

Inner housing 40 includes inner housing tubular member 46 which extends in longitudinal direction 18 internal central cavity 26 of outer housing 24. Additionally, cap member 48 is secured to inner housing tubular member 46 in fixed fashion. Cap member 48 is substantially planar in contour and extends over an upper section of outer housing 24 for releasable mounting of inner housing 40 to outer housing 24.

Cap member 48 includes cap flange member 50 for matingly engaging an outer surface of outer housing 24. Cap flange 50 provides for positional location of inner housing tubular member 46 substantially central to outer housing cavity 26. In this manner, food cavity 14 will be substantially formed central to a cross-sectional area of food container 10.

Inner housing tubular member 46 includes inner housing cavity 52 which terminates at inner housing base member 54. Thus, inner housing tubular member 46 is closed on one end defined by inner housing base member 54, and open on an opposing end 56 for communication with the external environment. Inner housing base member 54 is formed in generally one-piece formation with inner housing sidewall 58 to form inner housing tubular member 46. Sidewall 58 includes at least one opening 60 in communication on opposing sides with food product 28 and inner housing cavity 52. In this manner, gases produced during food product processing within mold 22 are vented from food product 28 to inner housing cavity 52 and then to the external environment.

In operation, the user initially inserts food product 28 within internal cavity 26 of outer housing 24. Food product 28 may be dough-like in constituency and pliable in nature. Food product 28 is not inserted to the upper section of sidewall 30 due to the fact that a portion will be displaced upon insertion of inner housing 40 within cavity 26.

Inner housing 40 is then inserted within cavity 26 of outer housing 24 and the dough-like food product 28 flows around inner housing outer wall surface 42 in an upward manner. The amount of food product 28 initially inserted within cavity 26 may have a predetermined volume in order that subsequent to insertion of inner housing 40 within cavity 26, that food product 28 fills or substantially fills the volume between inner housing 40 and outer housing 24. A predetermined clearance space may be left for expansion of food product 28 during the processing operation.

By the use of cap flange 50 of cap member 48, tubular member 46 is substantially centrally located within cavity 26. As is seen, tubular member 46 does not extend throughout the longitudinal length of outer housing 24. Food product 28 thus is molded on an undersurface of inner housing base member 54 to provide a closed contour edible food container 10 after processing.

Mold 22 with unprocessed food product 28 contained therein is then inserted into an oven or other heat generating device to bake or otherwise heat food product 28. Gases formed during the heating of food product 28 are vented through opening 60 to inner housing cavity 52 for egress to the external environment. Subsequent to food product 28 being processed within a heating chamber, mold 22 is removed therefrom. Inner housing 40 is removed from tubular member 30 and disc member 38 is displaced in longitudinal direction 18 to remove processed food product 28 from internal tubular member 30. In this manner, there is formed a closed-end edible feed container 10 having central food cavity 14 for insertion of food 12.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A container mold for processing a food product contained therein and facilitating removal therefrom, comprising:
    (a) outer housing means extending in a longitudinal direction being substantially cylindrically contoured providing a first internal diameter having a central cavity for insertion of a food product to be processed, said outer housing means defining a tubular member having an annularly contoured flange member secured to a lower section of a sidewall of said tubular member, said flange member extending to the interior of said tubular member, thereby providing a second centrally positioned internal diameter opening of said tubular member;
    (b) a disc member having a diameter substantially equal to said first internal diameter, said disc member being displaceably mounted on said annularly contoured flange member;
    (c) an inner housing tubular member resting on the top of said outer housing means and extending longitudinally internal of said central cavity of said outer housing means and spaced from the sides and bottom thereof defining an inner housing cavity having a closed bottom and an open end upper section, said inner housing tubular member having a plurality of openings formed through a sidewall thereof for venting gases produced during food product processing, said food product being contained between said inner housing tubular member and said outer housing means; and,
    (d) a cap member fixedly secured to said inner housing tubular member and around said outer housing tubular member sidewall, said cap member including a cap flange member matingly engaging an outer surface of said outer housing means and positionally locating said inner housing tubular member substantially central said outer housing means cavity.

2. A container mold as recited in claim 1 where said disc member is linearly displaceable within said central cavity of said outer housing means.

* * * * *